Patented July 6, 1948

2,444,801

UNITED STATES PATENT OFFICE 2,444,801

CREAMING OF SYNTHETIC RUBBER LATICES

Erving Arundale, Westfield, N. J., assignor to Standard Oil Development Company, a corporation of Delaware No Drawing. Application September 30, 1944, Serial No. 556,659

18 Claims. (Cl. 260—84.5)

This invention pertains to an improvement in the creaming of latices and in particular to the creaming of synthetic rubber latices obtained by the polymerization of diolefinic materials or by the copolymerization of diolefinic materials with certain monoolefinic compounds in aqueous emulsion. This application is a continuation in part of my application Serial No. 502,789, filed September 17, 1943.

Various methods are known for concentrating natural rubber latex from 38–40% total solids to 60–75% total solids. Such methods include creaming, centrifuging, evaporation, electrodecantation and filtration. Only the first three methods are used to any extent commercially, and of these, the creaming process is undoubtedly the most important since a minimum amount of equipment is required and concentrates of high solids content can be produced. Creaming has a further advantage particularly over the evaporation method due to the fact that water solubles for the most part tend to remain in the lower serum layer. Films deposited from the creams therefore generally have low ash and water absorption values.

These concentration processes work well with natural rubber latex because the particle size of the latex is quite large (1,000 m$\mu$) and because the difference in density between the rubber and the media is about 0.09 gm./cc. However, synthetic rubber latices cannot be concentrated readily to high solids content by the above-mentioned methods because of the fact that the particle size thereof is much smaller (10–200 m$\mu$) and the density difference is also smaller, amounting only to between 0.01 and 0.04 gm./cc. Since creaming involves the addition of hydrophilic colloids such as gums, mosses, alkali alginates, etc. to the dilute latex to slow down the Brownian movement and cause the rubber particles to rise to the surface due to the difference in density between the particles and the accompanying media, it is obvious that synthetic latices do not readily lend themselves to concentration by creaming. The same factors, i. e., particle size and density difference, also control concentration by centrifuging, filtration, etc. While synthetic rubber latices can be concentrated to approximately 40–45% solids content by an evaporation process through the removal of water by distillation under vacuum, this process is not satisfactory because it increases the amount of emulsifier and other water solubles in the concentrate. For example, when a latex prepared by the emulsion polymerization of butadiene and acrylonitrile using a soap emulsifier is concentrated from about 20% solids to about 40–45% solids by evaporation of water, the resultant concentrate is extremely viscous and the concentration of non-rubberlike material present therein is approximately doubled.

It is the object of this invention therefore to provide the art with a method whereby synthetic rubber latices may be concentrated satisfactorily by creaming.

It is also an object of this invention to provide a method whereby latices obtained by the polymerization of diolefinic materials in aqueous emulsion may be concentrated by creaming to form products having a rubber solids content of at least 45%.

It is a further object of this invention to provide creams of synthetic rubberlike emulsion polymerizates which contain at least 45% of rubber solids and possess a high degree of fluidity.

These and other objects will appear more clearly from the detailed description and claims set out below.

It has now been found that the creaming method can be applied to synthetic rubber latices provided that the size of the synthetic latex particles is increased by treating the dilute latex with solutions of salts of certain inorganic monovalent cations, organic amine salts, or organic acids in the proper concentrations. It is, of course, well known that solutions of inorganic salts, organic amine salts and organic acids in high concentrations cause the agglomeration of the rubber particles in synthetic latices to such an extent as to cause coagulation thereof. I have found that by treating the synthetic rubber latices with solutions of certain inorganic salts, organic amine salts or organic acids in a somewhat weaker concentration than has been employed in the coagulation of such latices, it is possible to obtain an enlargement in the particle size without any appreciable coagulation or agglomeration and at the same time increase the density of the media. For convenience, this treatment causing an enlargement of the latex particle size and increase in the density of the media will be termed destabilization and the inorganic salts, organic amine salts and organic acids which are added to increase the latex particle size will be termed a destabilization agent. This increase in particle size and density greatly facilitates creaming and concentrated latices containing approximately 50% total solids or higher can be produced. Such a particle size increase would also facilitate the centrifuging of such latices. Due to the fact that a large amount of emulsifier has been removed in the creaming process and that the particle size has been increased, the creams obtained at 50% total solids content or higher are fluid and films resulting therefrom contain low ash and water absorption values.

According to my invention, the dilute synthetic latex (pH 7.0–9.5) containing between 20–30% solids and preferably 22–25% solids is mixed with an aqueous solution containing about 1 to 7 weight per cent of a monovalent inorganic salt, an organic amine salt or an organic acid at a temperature between 20 and 75° C. whereupon an increase in particle size takes place. Solutions more dilute than 1% do not produce as extensive a particle size increase, while solutions more concentrated than 7% tend to bring about excessive coagulation of the latex. The concentration employed depends primarily upon the emulsifier content of the dilute latex. Introduction of the inorganic salt solutions in the form of an extremely fine spray or mist with good agitation of the latex does however permit the use of somewhat more concentrated solutions. It has also been found that saturated solutions of sodium, potassium or ammonium chlorides, 0.2 normal in ammonia, could be used similarly in small amounts, but the results in general were considered inferior to those obtained with the dilute solutions. For these reasons, it was found desirable to keep the salt solution concentration within the narrow range of 3–6 weight per cent for most latices.

The enlargement of particle size is facilitated if, after the addition of the destabilizing agent, the latex-destabilizing agent mixture is allowed to stand from ¼ to 2 hours or by lowering the pH of the original dilute latex with carbon dioxide or a weak acid before the introduction of the destabilizing agent. Destabilization can be carried out at room temperature (20–25° C.), but the results will be improved and the consumption of destabilizing agent decreased if the latex and/or destabilizing agent are heated before or after mixing to 35–75° C. and the mixture then allowed to stand at 35–75° C. until the particle size has increased. Care must be taken in all these operations, however, to prevent over-destabilization or gellation of the latex, which are brought by the use of too drastic destabilization conditions, particularly the use of too much destabilizer.

The latex destabilizers which can be used in accordance with the present invention include:

1. INORGANIC SALTS

The following ammonium, sodium, potassium or lithium salts:

| | |
|---|---|
| Fluorides | Persulfates |
| Chlorides | Molybdates |
| Bromides | Dichromates |
| Acetates | Nitrates |
| Formates | Hydroxyl ammonium chloride |
| Oxalates | |
| Mono basic phosphates | Hydroxyl ammonium sulfate |
| Bisulfites | |
| Sulfates | |

Regardless of the anion involved the activity of an electrolyte to increase particle size runs in the following order

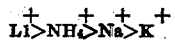

$$Li^+ > NH_4^+ > Na^+ > K^+$$

Salts of bivalent metals cannot be used since they produce coagulation of the rubber in the latex even in dilute solutions.

2. ORGANIC AMINE SALTS

The hydrochlorides or sulfates of organic bases such as

Methyl amine
Dimethyl amine
Trimethyl amine
Ethyl amine
Diethyl amine, etc.

3. ORGANIC ACIDS

Acids having dissociation constants between $1 \times 10^{-3}$ and $1 \times 10^{-5}$ such as

| | |
|---|---|
| Acetic acid | Lactic acid |
| Citric acid | Naphthalene sulfonic acid, etc. |
| Formic acid | |

Of the destabilizers listed above the following are to be preferred from a process standpoint:

Ammonium chloride
Ammonium fluoride
Ammonium monobasic phosphate
Sodium monobasic phosphate
Sodium bisulfite
Hydroxyl ammonium sulfate When using monobasic phosphate solutions, sufficient ammonia must be added to raise the pH of the solution to approximately 5.9 or above in order to prevent coagulation on addition to the latex. Generally the amount of local coagulation if any obtained on mixing the salt solution with the latex can be reduced if the pH of the salt solution is raised if necessary to between 7 and 7.7 before adding it to the latex. Concentrated aqueous (26%) ammonia, potassium hydroxide, dimethylamine, etc., can be used for this purpose. This also permits the addition of the salt solution (at temp. 25–35° C.) to the latex at a higher temperature (e. g. (60° C.) than heretofore without causing coagulation. Stronger salt solutions (up to 7%) can be used also if the pH of the solution is raised. NH₄Cl solution concentrations of this order may be necessary on latices containing high emulsifier contents.

When acids of the type mentioned above are to be used as destabilizers, the acid solution concentration should be between 0.05 and 2% and preferably 0.75–1%. Approximately 1–2 parts of acid and 0.5–1.0 part of ammonium alginate per 100 parts latex solids are satisfactory at a destabilization temperature of 25–35° C. Latices destabilized with such organic acids pass over to the acid side (pH 4.4–7) without coagulating and are stable in this condition for extended periods of time. Because of the possible corrosion problem involved, acids are not considered as satisfactory destabilizers as the salts.

According to my process, the salt solution, preferably of about 4–5.5 weight per cent concentration, is run or sprayed rapidly into the dilute latex with agitation. High speed agitation should be avoided while the latex is being destabilized. The solution is used in an amount equal to about 0.10–1.0 parts of solution per part of dilute latex, depending on the concentration of the salt solution, on the emulsifier content and pH of the dilute latex, and on the destabilization temperature. The salt should preferably be used in an amount equal to about 1–19 parts of dry salt per 100 parts of solids in the latex. After the salt solution has been added and the increase in particle size has occurred, an alkali such as ammonia gas, concentrated aqueous ammonium hydroxide, organic bases such as dimethylamine, morpholine, etc., or potassium hydroxide solution is added to raise the pH to between 9.0 and 10 and thereby restabilize the latex. Potassium hydroxide should be used to quench soap-type latices destabilized with large amounts, i. e., between about 6–19 parts of ammonium chloride per 100 parts of latex solids and ammonium hydroxide should be used on latices containing synthetic emulsifiers and on latices destabilized with monobasic phosphates. The KOH is used in an amount equal to 0.45–0.90 gm. of dry KOH per gm. of ammonium chloride and is employed preferably as a 9.2 normal solution. 0.68 part KOH per part ammonium chloride is very satisfactory. Ammonium hydroxide quench is used in an amount equal to 2.5–5 parts $NH_3$ per 100 parts latex solids. If the destabilization is carried out at elevated temperatures of about 60° C. or higher with less than about 6 parts of ammonium chloride per 100 parts of latex solids, it is possible to quench the destabilized mixture with a volatile base such as ammonia, or dimethylamine, etc. instead of with fixed alkalies such as KOH. The combination of ammonium chloride destabilization and ammonia or dimethylamine quench yield latex creams of low waer absorption and low ash values. Ammonia can only be used as a quench on ammonium chloride type creams, however, when small amounts of the salt are employed.

After restabilizing or quenching the latex with alkali, a creaming agent is added in aqueous solution or as a dry powder with stirring (if necessary high speed) whereupon the latex is heated to 35–60° C. (if not at this temperature already) to insure solution thereof. The agents which may be used include the usual rubber latex creaming agents, such as Carob Bean gum, alkali alginates, gum tragacanth, and so forth. The creaming agents are conveniently added to the latex as a 0.75–3% aqueous solution and in an amount equal to about 0.5–1.1 parts per 100 parts of rubber. After heating the latex containing the creaming agent, the mixture is allowed to stand 12–20 hours, whereupon the upper cream layer may be separated from the lower serum layer. The majority of creaming takes place in the first few hours, however. If the mixture is allowed to cream at a slightly elevated temperature (35–50° C.), the solids content of the cream is raised. The capacity of the creaming tower can be increased by allowing the mixture to cream 4 to 6 hours, withdrawing the serum and replacing it with an equal volume of uncreamed mixture and then allowing the batch to stand at least 12 hours. It is also possible to destabilize the latex with 5–5.5% salt solution, carrying the procedure through the ammonium alginate addition and then adding 10–50 parts of water per 100 parts latex. Creams containing approximately 50–55% solids and serums containing 0.3–0.5% rubber are obtained. The slight amount of rubber remaining in the serium after separation can be recovered if desired by heating the serum to 90–100° C. and filtering off the rubber.

This method can be used satisfactorily on synthetic rubber latices prepared from a wide variety of initial materials by the emulsion polymerization process. Artificial dispersions prepared from the dry rubber possess large particle sizes and consequently do not need such a destabilization before creaming. It may be applied, for example, to latices obtained by the polymerization in aqueous emulsion of conjugated diolefins, such as butadiene, isoprene, piperylene, dimethyl butadiene, 2-chlorobutadiene-1,3, taken singly or in combination, or to emulsion copolymerizates obtained by polymerizing such diolefins in combination with unsaturated comonomers, i. e. copolymerizable compounds containing a single terminal methylene group such as styrene, homologues of styrene, such as alpha methyl styrene, para methyl styrene, alpha methyl para methyl styrene, nitriles of low molecular weight unsaturated acids such as acrylonitrile, methacrylonitrile or chloroacrylonitrile, methyl acrylate, methyl methacrylate and ketones such as methyl vinyl ketone or mixtures thereof. These latices will be referred to as synthetic rubber latices or synthetic rubber latices of the Buna type and are not to be confused with any artificial latices or dispersions prepared from solid rubber whether derived from nature or by synthesis.

The emulsions of the diolefinic reactants can be prepared with the aid of a wide variety of emulsifying agents including soaps, rosin soaps, alkylated naphthalene sulfonic acid salts, high molecular weight alkyl sulfates or sulfonates and, in general, any emulsifier yielding a neutral to alkaline reaction mixture although the use of potassium oleate is to be preferred. Salts of high molecular weight amines such as dodecylamine hydrochloride, trimethyl cetyl ammonium chloride or sulfate etc. are not satisfactory since the resultant emulsion or latex has a pH below 7 and is therefore not stable at the pH necessary for effective creaming. The emulsifier content of the original latex has a great effect upon the results obtained with this process. For example, when latices contain high soap contents, increased amounts of salt solution, increased concentrations of salt solution, $CO_2$, more creaming agent, longer contact times and/or higher temperatures should be employed for best results. When operating at a destabilization temperature of 60° C. between 0.8 and 1.4 parts of dry $NH_4Cl$ (as 4–6% sol.) are normally required for each part of oleate soap (based on solids) present in the latex. The soap is determined by titrating the latex with 0.05 normal acid to a bromophenol blue endpoint. Latices prepared in the presence of synthetic emulsifiers require mild destabilization conditions since the emulsifier concentration of such latices is usually low. The higher the initial solids content of the dilute latex the smaller the amount of destabilizer necessary to produce optimum creaming results. However, to obtain maximum cream purity the destabilized batch should be diluted to at least 20% totals solids prior to the addition of creaming agent.

Latices to be creamed should, for best results, contain low soap contents (1.5%–4% based on rubber). Such low soap contents can be obtained by conducting the original polymerization in the presence of reduced quantities of emulsifier or the soap content of the dilute latex can be lowered (pH also lowered) through the addition of carbon dioxide, dilute (0.75%) acetic acid, certain buffers, etc.

After the polymerization has been carried to the desired conversion, a reaction short-stop (e. g. hydroxyl amine hydrochloride, hydroxyl amine sulfate, free hydroxyl amine, phenyl ethanol amine, etc.) is added to the latex which is then vacuum stripped to remove unreacted monomers. The stripped latex is then subjected to the creaming process. The antioxidant necessary to prevent aging of the rubber is added to the destabilized batch just prior to the addition of creaming agent or to the final cream.

The creams prepared in accordance with this invention are stable to mechanical agitation and to compounding dispersions and can be used in conventional latex operations such as spreading, dipping, gelation, impregnation, coating electrodeposition and the like.

The following examples are illustrative of the present invention:

EXAMPLE I

A synthetic rubber latex was prepared by polymerizing butadiene and acrylonitrile (wt. ratio 62/38) in the presence of water (2/1 ratio water/reactants) and 1.75% oleate soap emulsifier (on water). The latex had a pH of 7.9 and contained 22% total solids. Five creaming runs were made using this latex. Various inorganic salt solutions were employed in the first four runs, and the fifth was made in the absence of the salt solution to show the effect of the salt addition on the creaming results. The salt solution was run into the latex slowly with agitation and the mixtures were then allowed to stand ½ hour. 13% ammonia water was then added in order to raise the pH of the latices to the values shown. Finally, the 2% ammonium alginate solution was added and the mixtures heated to 60° C. and then allowed to cream overnight. The results are given in the Table I.

Table I

| Salt Sol. | Parts salt sol./part latex | pH after salt sol. | pH after Ammonia | Parts Ammonium Alginate/100 Parts Solids | Temp. of Heating after Creaming Agent °C. | Percent Total Solids | |
|---|---|---|---|---|---|---|---|
| | | | | | | Cream | Serum |
| 4% NaCl | 0.75 | 8.3 | 10.2 | 0.8 | 60 | 46.4 | 3.13 |
| 4% NH₄Cl | 0.75 | 7.5 | 8.7 | 0.8 | 45 | 57.3 | 3.06 |
| 4% (NH₄)₂SO₄ | 0.75 | 7.5 | 8.8 | 0.8 | 60 | 45.3 | 4.3 |
| 4% NaH₂PO₄ | 0.75 | 6.2 | 9.1 | 0.6 | 60 | 52.5 | 2.94 |
| No salt sol | | 8.2 | 10.4 | 0.8 | 60 | 32.9 | 4.92 |

EXAMPLE II 2016 gms. of synthetic rubber latex (prepared by copolymerizing butadiene and acrylonitrile (74/26 wt. ratio) in the presence of 1.75% potassium oleate emulsifier (on water) and 2/1 ratio water/reactants) possessing a pH of 8.4 and containing 22.3% solids were heated to 35.5° C. 1251 gms. of 3.97 weight per cent ammonium chloride solution (pH, 5.7) were also heated to the same temperature. The ammonium chloride solution was run into the warm latex over a period of five minutes. The mixture was then allowed to stand ¾ hour at 35° C. and was stirred intermittently during this time. The pH at the end of the ¾ hour interval was 7.5. The mixture was then quenched with 91.4 gms. of 9.2 normal KOH solution. The pH after quenching was 9.7. 207 gms. of ammonium alginate solution (1.96%) were added and stirred into the latex at 35° C. The mixture was allowed to cream 21 hours at a temperature of 27–31° C.

Results

| | Per cent Total Solids | Per cent Dry Rubber Content | Per cent of Total Rubber Present |
|---|---|---|---|
| Cream (pH 9.35) | 54.0 | 52.6 | 97.9 |
| Serum | 2.72 | 0.37 | 2.1 |

EXAMPLE III 2240 gms. of the same latex employed in Example II were heated to 35.5° C. 1120 gms. of 3.96% NaH₂PO₄ solution (pH raised to 5.9 with conc. NH₄OH) were also heated to 35.5° C. and then run into the latex rapidly over a period of five minutes. The mixture was allowed to stand ½ hour at 35° C. The pH of the mixture after standing was 6.4. The batch was then quenched with 26.8 gms. of concentrated ammonium hydroxide to raise the pH to 9.0. 237 gms. of 1.90 weight per cent ammonium alginate solution were then added, and the mixture was stirred for ¼ hour, after which it was placed in the creaming tower and allowed to cream 22 hours at 29–31° C.

Results

| | Per cent Total Solids | Per cent Dry Rubber Content |
|---|---|---|
| Cream (pH 8.7) | 50.5 | 47.7 |
| Serum | 2.34 | 0.495 |

EXAMPLE IV

A synthetic latex was prepared by copolymerizing butadiene with acrylonitrile (wt. ratio 74/26) in the presence of 2.5% sodium oleate emulsifier (on water) and a 2/1 ratio of water/reactants. The latex contained 21.1% total solids and had a pH of 8.1 1424 gms. of 4% ammonium chloride solution were added to 1896 gms. of this latex at room temperature over a period of 15 minutes. The mixture was then allowed to stand two hours at room temperature, after which it was heated to 48° C. and then quenched while at this temperature with 96 cc. of 9.2 normal KOH solution. The mixture was heated to 60° C., and then 200 gms. of 2% ammonium alginate solution were added and stirred in. The batch was allowed to cream 22 hours at 32–21° C.

Results

| | Per cent Total Solids | Per cent Dry Rubber Content |
|---|---|---|
| Cream | 53.6 | 51.8 |
| Serum | 3.46 | 0.54 |

EXAMPLE V 224 gms. of a synthetic rubber latex (prepared by copolymerizing butadiene and acrylonitrile (wt. ratio 74/26) in the presence of 1.1% sodium lauryl sulfate emulsifier (on water) and 2/1 ratio water/reactants) possessing a pH of 5.0 and containing 22.3% total solids were heated to 35.5° C. and then mixed with 78.4 gms. of 4% ammonium chloride solution previously heated to the same temperature. The mixture was allowed to stand ¾ hour at 35° C. and was then quenched with 4.5 cc. of concentrated ammonium hydroxide. 23 gms. of 1.88% ammonium alginate solution were stirred in while heating to 50° C., and the mixture was then allowed to cream 18½ hours at room temperature. The resulting cream contained 51.1% total solids, and the serum 2.12% total solids.

EXAMPLE VI 224 gms. of synthetic latex (prepared by copolymerizing butadiene and styrene (wt. ratio 74/26) in the presence of 2.77% Ivory Flakes (on water) and 1.8:1 ratio water: reactants) possessing a pH of 8.3 and containing 22.3% total solids were heated to 35° C. and then mixed with 139.5 gms. of 5 weight per cent ammonium chloride solution, also heated to 35° C. The batch was allowed to stand ¾ hour and was then quenched with 9.2 cc. of 9.2 normal KOH solution. 25 gms. of 1.88 weight per cent ammonium alginate solution were finally added with stirring while the mixture was being heated to 50° C. After creaming 18½ hours, the upper cream layer contained 49% total solids, and the lower serum layer 3.57% total solids.

It may be seen from these data that increasing the particle size by adding an inorganic salt solution in accordance with this invention is essential in order to obtain creams of high solids content and serums of low solids content. At the end of the creaming process when an inorganic salt solution is added to increase the particle size, it was found that 97–98.5% of the total rubber present in the original dilute synthetic latex is present in the cream.

EXAMPLE VII 224 parts of the same latex employed in Example II were heated to 35.5° C. 40.2 parts of 4.95 weight per cent NH₄Cl sol. (pH 5.2) were also heated to the same temperature and then run into the latex. The temperature of the mixture was raised to 60° C. and the batch was allowed to stand at this temperature for 45 minutes. 3.7 parts of 9.2 normal KOH solution were run in and the mixture allowed to stand 1 hour, after which 21.2 parts of a 1.93 per cent ammonium alginate solution were added and stirred in. The mixture was allowed to cream overnight, whereupon the cream contained 51.4 per cent total solids and the serum 1.91 per cent total solids.

EXAMPLE VIII 11,250 parts of a synthetic rubber latex (prepared by copolymerizing butadiene and acrylonitrile (wt. ratio 74/26) in the presence of 3.5% oleic acid (on reactants) (77% neutralized with KOH) and a 2/1 ratio water/reactants) possessing a pH of 7.9 and containing 22.3% total solids were heated to 60° C. 1575 parts of a 7 wt. per cent ammonium chloride solution (pH raised to 7.7 with 3.16 parts concentrated aqueous NH₄OH) were heated to 55–60° C. and then run into the latex rapidly with stirring. Batch was then agitated very slowly at 60° C. for one hour (pH 7.6) after which 370 parts of concentrated aqueous ammonia water were added with rapid agitation (pH now 9.7). 1250 parts of 2% ammonium alginate solution were finally added, the batch was stirred ¼ hour and then allowed to cream. Total solids before creaming 18.2%.

*Per cent total solids*
Cream _____ 50.3 (pH 9.6)
Serum _____ 1.82

The cream contained 0.24% ash (based on total solids) and the serum 0.34% rubber.

EXAMPLE IX 217.5 parts of a synthetic rubber latex (prepared by copolymerizing butadiene with acrylonitrile, wt. ratio 74/26, in the presence of 2.75% oleic acid (on reactants)—95% neutralized with potassium hydroxide and a 1.7/1 ratio water to reactants) possessing a pH of 7.9, a potassium oleate content of 3.5% (based on solids) and 23% total solids content were heated to 35° C. and 36 parts of a 5% ammonium chloride solution (pH raised to 7.1 with ammonia water) were then run in rapidly with agitation. The batch was heated to 60° C. and allowed to stand one hour (pH 7.5) after which 5.4 parts of concentrated aqueous ammonia were added with stirring (pH now 9.6) followed by 22 parts of 2% ammonium alginate solution. After creaming overnight the following results were obtained:

*Percent total solids*
Cream _____ 50.3 (0.43% ash on total solids)
Serum _____ 1.77 (0.47% dry rubber content)

EXAMPLE X 224 parts of a Buna N latex prepared in the presence of potassium oleate emulsifier (pH 7.8—total solids 22.3%) were heated to 35° C. and 140 parts of a 0.75 wt. per cent acetic acid solution (previously heated to 35° C.) were run in. The mixture was allowed to stand at 35° C. for ¼ hour and was then neutralized with 4.5 parts of concentrated ammonium hydroxide. 16 parts of a (1.88% solids) ammonium alginate solution were added and the mixture was heated to 50° C. and then allowed to cream overnight. The cream contained 50% solids and the serum 1.52% solids.

It may be seen from the foregoing description that I have provided a novel method whereby creams of high solids content may be readily prepared from synthetic rubber latices. It will be understood that my invention is not limited to the foregoing specific embodiments but may be varied without departing from the purview of the subjoined claims.

What I claim and desire to secure by Letters Patent is:

1. The process of creaming synthetic latices having a pH of 7–9.5 and containing 20 to 30% solids prepared by the polymerization of a conjugated diolefin of from 4 to 6 carbon atoms per molecule in aqueous emulsion in the presence of a water soluble fatty acid soap emulsifier which comprises adding an aqueous solution containing from 1 to 7 weight per cent of a destabilizing agent selected from the group consisting of inorganic salts of aliphatic amines in which the alkyl group contains 1 to 2 carbon atoms and salts of lithium, sodium, potassium and ammonium to said latices at a temperature of 20–75° C., the total amount of destabilizing agent added being from 1 to 19 parts per 100 parts of latex solids, said amount of destabilizing agent being sufficient to effect a substantial increase in the particle size of the latex but insufficient to cause coagulation thereof, treating the resultant latex with an alkali to render it stable, adding a creaming agent to the treated latex and thereafter effecting a separation between the latex cream and the serum.

2. The process of creaming synthetic latices having a pH of 7–9.5 and containing 20 to 30% solids prepared by the copolymerization of a conjugated diolefin of from 4 to 6 carbon atoms per molecule with a copolymerizable compound containing a single CH₂=C= group in aqueous emulsion in the presence of a water soluble fatty acid soap emulsifier which comprises adding an aqueous solution containing from 1 to 7 weight per cent of a destabilizing agent selected from the group consisting of inorganic salts of aliphatic amines in which the alkyl group contains 1 to 2 carbon atoms and salts of lithium, sodium, potassium and ammonium to said latices at a temperature of 20-75° C., the total amount of destabilizing agent added being from 1 to 19 parts per 100 parts of latex solids, said amount of destabilizing agent being sufficient to effect a substantial increase in the particle size of the latex but insufficient to cause coagulation thereof, treating the resultant latex with an alkali to render it stable, adding a creaming agent to the treated latex and thereafter effecting a separation between the latex cream and the serum.

3. The process of creaming synthetic latices having a pH of 7-9.5 and containing 20 to 30% solids prepared by the copolymerization of a conjugated diolefin of from 4 to 6 carbon atoms per molecule and acrylonitrile in aqueous emulsion in the presence of a water soluble fatty acid soap emulsifier which comprises adding an aqueous solution containing from 1 to 7 weight per cent of a destabilizing agent selected from the group consisting of inorganic salts of aliphatic amines in which the alkyl group contains 1 to 2 carbon atoms and salts of lithium, sodium, potassium and ammonium to said latices at a temperature of 20-75° C., the total amount of destabilizing agent added being from 1 to 19 parts per 100 parts of latex solids, said amount of destabilizing agent being sufficient to effect a substantial increase in the particle size of the latex but insufficient to cause coagulation thereof, treating the resultant latex with an alkali to render it stable, adding a creaming agent to the treated latex and thereafter effecting a separation between the latex cream and the serum.

4. The process of creaming synthetic latices having a pH of 7-9.5 and containing 20 to 30% solids prepared by the copolymerization of a conjugated diolefin of from 4 to 6 carbon atoms per molecule and styrene in aqueous emulsion in the presence of a water soluble fatty acid soap emulsifier which comprises adding an aqueous solution containing from 1 to 7 weight per cent of a destabilizing agent, selected from the group consisting of inorganic salts of aliphatic amines in which the alkyl group contains 1 to 2 carbon atoms and salts of lithium, sodium, potassium and ammonium, to said latices at a temperature of 20-75° C., the total amount of destabilizing agent added being from 1 to 19 parts per 100 parts of latex solids, said amount of destabilizing agent being sufficient to effect a substantial increase in the particle size of the latex but insufficient to cause coagulation thereof, treating the resultant latex with an alkali to render it stable, adding a creaming agent to the treated latex and thereafter effecting a separation between the latex cream and the serum.

5. The process of creaming synthetic latices having a pH of 7-9.5 and containing 20 to 30% solids prepared by the polymerization of a conjugated diolefin of from 4 to 6 carbon atoms per molecule in aqueous emulsion in the presence of a water soluble fatty acid soap emulsifier which comprises adding an aqueous solution containing from 1 to 7 weight per cent of a destabilizing agent selected from the group consisting of inorganic salts of aliphatic amines in which the alkyl group contains 1 to 2 carbon atoms and salts of lithium, sodium, potassium and ammonium to said latices, the total amount of destabilizing agent added being from 1 to 6 parts per 100 parts of latex solids, maintaining the latex-destabilizing agent solution mixture at 60-75° C. for from ¼ to 2 hours, adding a volatile base to the said mixture to restabilize the latex, adding a creaming agent to the treated latex and thereafter effecting a separation between the latex cream and the serum.

6. The process of creaming synthetic latices having a pH of 7-9.5 and containing 20 to 30% solids prepared by the copolymerization of a conjugated diolefin of from 4 to 6 carbon atoms per molecule with a copolymerizable compound containing a single $CH_2=C=$ group in aqueous emulsion in the presence of a water soluble fatty acid soap emulsifier which comprises adding an aqueous solution containing from 3 to 6 weight per cent of a destabilizing agent selected from the group consisting of inorganic salts of aliphatic amines in which the alkyl group contains 1 to 2 carbon atoms and salts of lithium, sodium, potassium and ammonium to said latices, the total amount of destabilizing agent added being from 1 to 6 parts per 100 parts of latex solids, maintaining the latex-destabilizing agent solution mixture at 60-75° C. for from ¼ to 2 hours, adding a volatile base to the said mixture to restabilize the latex, adding a creaming agent to the treated latex and thereafter effecting a separation between the latex cream and the serum.

7. The process of creaming synthetic latices having a pH of 7-9.5 and containing 20 to 30% solids prepared by the copolymerization of a conjugated diolefin of from 4 to 6 carbon atoms per molecule and acrylonitrile in aqueous emulsion in the presence of a water soluble fatty acid soap emulsifier which comprises adding an aqueous solution containing from 3 to 6 weight per cent of a destabilizing agent selected from the group consisting of inorganic salts of aliphatic amines in which the alkyl group contains 1 to 2 carbon atoms and salts of lithium, sodium, potassium and ammonium to said latices, the total amount of destabilizing agent added being from 1 to 6 parts per 100 parts of latex solids, maintaining the latex-destabilizing agent solution mixture at 60-75° C. for from ¼ to 2 hours, adding a volatile base to the said mixture to restabilize the latex, adding a creaming agent to the treated latex and thereafter effecting a separation between the latex cream and the serum.

8. The process of creaming synthetic latices having a pH of 7-9.5 and containing 20 to 30% solids prepared by the copolymerization of a conjugated diolefin of from 4 to 6 carbon atoms per molecule and styrene in aqueous emulsion in the presence of a water soluble fatty acid soap emulsifier which comprises adding an aqueous solution containing from 3 to 6 weight per cent of a destabilizing agent selected from the group consisting of inorganic salts of aliphatic amines in which the alkyl group contains 1 to 2 carbon atoms and salts of lithium, sodium, potassium and ammonium to said latices, the total amount of destabilizing agent added being from 1 to 6 parts per 100 parts of latex solids, maintaining the latex-destabilizing agent solution mixture at 60-75° C. for from ¼ to 2 hours, adding a volatile base to the said mixture to restabilize the latex, adding a creaming agent to the treated latex and thereafter effecting a separation between the latex cream and the serum.

9. The process as defined in claim 5 wherein the destabilizing agent is ammonium chloride, the volatile base is ammonia and the creaming agent is ammonium alginate.

10. The process as defined in claim 6 wherein the destabilizing agent is ammonium chloride, the volatile base is ammonia and the creaming agent is ammonium alginate.

11. The process as defined in claim 7 wherein the destabilizing agent is ammonium chloride, the volatile base is ammonia and the creaming agent is ammonium alginate.

12. The process as defined in claim 8 wherein the destabilizing agent is ammonuim chloride, the volatile base is ammonia and the creaming agent is ammonium alginate.

13. The process of creaming synthetic rubber latices and containing 20 to 30% solids prepared by the polymerization of a conjugated diolefin of from 4 to 6 carbon atoms per molecule in aqueous emulsion in the presence of a water soluble fatty acid soap emulsifier which comprises adding an aqueous solution containing from 3 to 6 weight per cent of a destabilizing agent selected from the group consisting of inorganic salts of aliphatic amines in which the alkyl group contains 1 to 2 carbon atoms and salts of lithium, sodium, potassium and ammonium to said latices at a temperature of from 20 to 35° C., the total amount of destabilizing agent added being from 4 to 14 parts per 100 parts of latex solids, said amount being sufficient to effect a substantial increase in the particle size of the latex but insufficient to cause coagulation thereof, treating the resulting latex with a fixed alkali to render it stable, adding a creaming agent to the thus treated latex and thereafter effecting a separation between the latex cream and the serum.

14. The process of creaming synthetic rubber latices and containing 20 to 30% solids prepared by the copolymerization of a conjugated diolefin of from 4 to 6 carbon atoms per molecule and a copolymerizable compound containing a single $CH_2=C=$ group, in aqueous emulsion in the presence of a water soluble fatty acid soap emulsifier which comprises adding an aqueous solution containing from 3 to 6 weight per cent of a destabilizing agent selected from the group consisting of inorganic salts of aliphatic amines in which the alkyl group contains 1 to 2 carbon atoms and salts of lithium, sodium, potassium and ammonium to said latices at a temperature of from 20 to 35° C., the total amount of destabilizing agent added being from 4 to 14 parts per 100 parts of latex solids, said amount being sufficient to effect a substantial increase in the particle size of the latex but insufficient to cause coagulation thereof, treating the resulting latex with a fixed alkali to render it stable, adding a creaming agent to the thus treated latex and thereafter effecting a separation between the latex cream and the serum.

15. The process of creaming synthetic rubber latices and containing 20 to 30% solids prepared by the copolymerization of a conjugated diolefin of from 4 to 6 carbon atoms per molecule and acrylonitrile in aqueous emulsion in the presence of a water soluble fatty acid soap emulsifier which comprises adding an aqueous solution containing from 3 to 6 weight per cent of a destabilizing agent selected from the group consisting of inorganic salts of aliphatic amines in which the alkyl group contains 1 to 2 carbon atoms and salts of lithium, sodium, potassium and ammonium to said latices at a temperature of from 20 to 35° C., the total amount of destabilizing agent added being from 4 to 14 parts per 100 parts of latex solids, said amount being sufficient to effect a substantial increase in the particle size of the latex but insufficient to cause coagulation thereof, treating the resulting latex with a fixed alkali to render it stable, adding a creaming agent to the thus treated latex and thereafter effecting a separation between the latex cream and the serum.

16. The process as defined in claim 13 wherein the destabilizing agent is ammonium chloride, the alkali is potassium hydroxide and the creaming agent is an alkali alginate.

17. The process as defined in claim 14 wherein the destabilizing agent is ammonium chloride, the alkali is potassium hydroxide and the creaming agent is an alkali alginate.

18. The process as defined in claim 15 wherein the destabilizing agent is ammonium chloride, the alkali is potassium hydroxide and the creaming agent is an alkali alginate.

ERVING ARUNDALE.

REFERENCES CITED

The following references are of record in the file of this patent:

UNITED STATES PATENTS

| Number | Name | Date |
|---|---|---|
| 2,326,956 | Mack | Aug. 17, 1943 |
| 2,357,861 | Willson | Sept. 12, 1944 |
| 2,378,695 | Fryling | June 19, 1945 |
| 2,393,261 | Peaker | Jan. 22, 1946 |

FOREIGN PATENTS

| Number | Country | Date |
|---|---|---|
| 472,912 | Great Britain | Oct. 1, 1937 |
| 525,656 | Great Britain | Sept. 2, 1940 |
| 527,219 | Great Britain | Oct. 4, 1940 |

OTHER REFERENCES

Mueller, India Rubber World, Oct. 1942, pp. 33–35 and 41.